United States Patent
Kamalov et al.

(10) Patent No.: US 7,149,424 B2
(45) Date of Patent: Dec. 12, 2006

(54) METHOD AND DEVICE FOR EVALUATING AND IMPROVING THE QUALITY OF TRANSMISSION OF A TELECOMMUNICATIONS SIGNAL THROUGH AN OPTICAL FIBER

(75) Inventors: Valey F. Kamalov, Boca Raton, FL (US); Albrecht Neudecker, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 636 days.

(21) Appl. No.: 10/225,868

(22) Filed: Aug. 22, 2002

(65) Prior Publication Data
US 2004/0037569 A1 Feb. 26, 2004

(51) Int. Cl.
*H04B 10/08* (2006.01)
(52) U.S. Cl. ............................ 398/27; 398/25; 398/26; 398/30; 398/31; 398/33; 398/34; 398/38; 398/94; 398/95; 398/147; 398/155; 398/158; 398/159; 398/162; 398/192; 398/193; 398/194; 398/195; 398/196; 398/197; 398/198; 398/199; 398/208; 398/214

(58) Field of Classification Search ............... 398/25, 398/26, 27, 29, 33, 38, 91, 93, 94, 147, 158, 398/192, 197, 196, 199, 30, 31, 34, 159, 398/162, 193, 194, 195, 198, 214, 208
See application file for complete search history.

(56) References Cited

U.S. PATENT DOCUMENTS

| 6,433,904 B1* | 8/2002 | Swanson et al. .............. 398/91 |
| 6,934,479 B1* | 8/2005 | Sakamoto et al. .......... 398/193 |
| 2002/0039217 A1* | 4/2002 | Saunders et al. ........... 359/161 |
| 2004/0076430 A1* | 4/2004 | Zaacks et al. ................ 398/27 |

* cited by examiner

*Primary Examiner*—Hanh Phan

(57) ABSTRACT

A system and method for improving the transmission quality of a WDM optical communications system begins by determining the bit-error rate for an optical channel before forward error correction is performed at a receiver. The pre-corrective bit-error rate is fed back through a feed back circuit that includes a parameter adjustment module which adjusts an optical signal parameter based on the bit-error rate. As examples, the signal parameter may be a channel power, dispersion, signal wavelength, the chirp or eye shape of an optical signal. The feedback circuit may also adjust various parameters within the WDM system, including amplifier gain, attenuation, and power for one or more channels in the system. By adjusting these parameters based on a pre-corrective bit-error rate, transmission quality is improved and costs are lowered through a reduction in hardware.

34 Claims, 4 Drawing Sheets

METHOD AND DEVICE FOR EVALUATING AND IMPROVING THE QUALITY OF TRANSMISSION OF A TELECOMMUNICATIONS SIGNAL THROUGH AN OPTICAL FIBER

BACKGROUND OF THE INVENTION

1. Field of the Invention

This invention generally relates to optical communications systems, and more particularly to a system and method for improving the quality of signal transmissions through an optical fiber within a dense wavelength division multiplexing (DWDM) system.

2. Description of the Related Art

Optical communication systems are a substantial and fast-growing constituent of modern communications networks. These systems demonstrate greater bandwidth, lower power requirements, and lower-bit error rates than conventional, non-optical transmission systems. Because of their superior performance, optical systems are highly desirable have shown that they are better suited to high-speed data, video, voice, and other integrated transmissions.

One goal shared by optical engineers in designing optical communication systems is to increase the data transmission capacity of the fiber-optic transmission lines. Wavelength division multiplexing (WDM) has emerged as a particularly favored technology for this purpose. In a WDM system, a plurality of optical channels are carried over a single optical fiber. This is made possible by assigning each channel a different optical wavelength; each of the several wavelengths being transmitted within the optical fiber simultaneously. When different transmitter-receiver pairs are connected to the optical fiber, each pair being tuned to a different wavelength, the overall optical system can support multiple optical channels on the optical fiber. Such an increase in data throughput makes WDM suitable for use in a variety of high-speed telecommunications applications, including cable television, and world-wide-web access.

The performance of a digital receiver in a fiber-optic communications system can be measured in terms of its bit-error rate (BER). This rate expresses the percentage of bits received in error, for example by an optical receiver, compared to the total number of bits received. As an example, a bit-error rate of $10^{-6}$ means that, on average, one bit error occurs per million bits received. In typical optical communications systems, BERs of $10^{-13}$ are achievable as an operating requirement, although much lower BERs are possible. Since any improvement in the BER of an optical system directly affects the performance efficiency of the overall system, it is a common design objective of optical communications systems to achieve the lowest possible BER.

Numerous approaches not directly related to the measurement of BERs have been taken to improve signal transmission quality in optical communications systems. Traditionally, the optical signal to noise ratio (OSNR) for an optical channel has been used to approximate or quantify the BER for that channel as a result of the known relationships between OSNR and BER. See P. C. Becker, N. A. Olsson, J. R. Simpson, "Erbuim-Doped Fiber Amplifiers," Academic Press, 1997, p.216. The OSNR value represents a measure of the relative strength of an optical transmission signal as compared to the background noise present in the signal. The OSNR can be typically measured by expensive hardware, such as an optical spectrum analyzer which adds additional, expensive equipment to the system, in combination with specially designed software. This hardware and software is often used within different repeater stages of the optical transmission system and is used to evaluate the overall optical signal spectrum and quantify the optical signal through a comparative analysis of the signal's spectral position and power (strength) vis-a-vis the signal's background noise. As an example, if the OSNR for a particular optical channel is measured to be below a certain, acceptable threshold value, one of the optical parameters of that optical channel, such as the optical channel power, may be adjusted until the OSNR (and thus BER) is increased.

However, the relationship between the OSNR and the BER is imperfect. In particular, the OSNR is unaffected by certain optical properties of the transmission channel that can result in bit errors that directly affect the BER. For example, the chromatic dispersion and polarization mode dispersion of an optical signal do not affect the signal amplitude and hence do not affect the OSNR. These dispersive characteristics do, however, affect the bit errors experienced within an optical channel in a DWDM optical system since they lead to pulse spreading.

Thus the need exists for an inexpensive and easily implemented measure of the BER of an optical signal channel within an optical communications system. Such a measure should avoid the deficiencies of approximating the BER with a measure of the OSNR so that a direct and measurable improvement in the transmission quality of optical channel signals is achieved.

SUMMARY OF THE INVENTION

The present invention involves a system for improving transmission quality in a communications system; the system includes a transmitter having an parameter adjustment module, the transmitter outputting an encoded signal, the parameter adjustment module adjusting a parameter of the encoded signal; a communications link having first and second ends, the first end being connected to the transmitter; a receiver connected to the second end of the communications link, the receiver including an error detection module that determines a bit-error rate for a signal channel over which the encoded signal is transmitted; and a feedback path coupling the transmitter and the receiver, the feedback path feeding back the bit-error rate from the error module, wherein the parameter adjustment module adjusts the parameter of the encoded signal based on the fed back bit-error rate.

In one particular embodiment of the system, the error module further includes a forward error correction module that determines a number of bit errors within the encoded signal received by the receiver, the determined number of bit errors being used to determine the bit error rate, the forward error correction module correcting a portion of the determined number of bits errors after the bit error rate is fed back over the feedback path and outputting a corrected, encoded output signal from the system.

In another aspect of the system the communications link further includes a plurality of channels over which a plurality of associated encoded signals are transmitted, the parameter adjustment module adjusts the parameter of one of the encoded signals according to the fed back bit error rate.

In another aspect, the system, further includes a comparator, the comparator uses the fed back bit error rate to cause the parameter adjustment module to adjust the parameter of at least one of the plurality of encoded signal so as to achieve an optimal bit error rate over the plurality of channels. In this aspect, the parameter of the encoded signal may be signal power. Also the communications link may further include a plurality of channels over which a plurality of associated encoded signals are transmitted, the parameter adjustment module adjusting the power of at least one of the encoded signals according to the fed back bit error rate so as to achieve an optimal bit error rate over the plurality of channels.

In yet another aspect of the system, the communication system is an optical communication system, the communications link is an optical fiber, the encoded signal is an optical signal, and the parameter adjustment module adjusts an optical parameter of the optical signal. In this aspect the system may further include an optical amplifier coupled to the transmitter for adjusting an optical transmission power as the parameter of the optical signal. Also in this system, the optical parameter may be a chirp of the optical signal. Further, the optical parameter may be an operating wavelength of the encoded optical signal or an eye shape of the optical signal transmitted on the optical fiber. In addition, the optical parameter may be a polarization of the optical signal transmitted on the optical fiber. Further, the system's parameter adjustment module may be a dispersion compensator and the optical parameter may be a dispersion of the optical signal such that the dispersion on the optical fiber is minimized by the dispersion compensator; or the parameter adjustment module may adjust a plurality of the following optical parameters of the optical signal based on the fed back bit error rate: an optical channel power, an optical channel wavelength, a optical channel chirp, an optical signal polarization, and an eye shape of an optical signal transmitted on the optical channel.

In yet other aspects of the system, the optical fiber is included within a wave-division multiplexed optical system; the wave-division multiplexed system includes a plurality of optical channels each containing an encoded optical signal. In this system, the feed back path may be an optical supervisory channel of the wave-division multiplexing system for transmitting the bit error rate, the optical supervisory channel being separate from the plurality of optical channels transmitting the encoded optical signals. Further, the parameter adjustment module may include a variable optical attenuation unit for each channel within the WDM system, each variable optical attenuation unit adjusting an attenuation parameter for the optical signal in each channel based on the bit-error rate. Still further, the system may include an amplifier coupled to each of the channels of the WDM system, the amplifiers including a gain control unit as the parameter adjustment module, the gain control unit adjusting a gain and gain tilt of at least one of the amplifiers for the optical channel based on the fed back bit-error rate. In addition, the parameter adjustment module may include a Raman amplifier, the parameter adjustment module adjusting a parameter of the Raman amplifier based on the bit-error rate; or the parameter adjustment module includes a polarization unit, the parameter adjustment module adjusting a polarization of the optical signal. Further, the parameter adjustment module may adjust a plurality of the following optical parameters of the optical signal within an optical channel in the WDM system based on the fed back bit error rate: a variable optical attenuation, an amplifier gain and gain tilt, a Raman amplifier parameter, an optical power, and a polarization for an optical signal.

In yet another aspect of the present invention, the transmitter may include an electro-optical transducer for converting the encoded signal from an electrical signal to an optical signal. and/or the system further includes a regenerator coupled to the communications link.

In an other embodiment of the present invention, a transmitter is coupled to a communications link and a bit error rate channel, the transmitter transmits an encoded signal over the communications link, the transmitter includes an input port for receiving bit-error rate information over the bit error rate channel; and a parameter adjustment module is coupled to the input port that adjusts a parameter of the encoded signal based on the received bit-error rate information.

In a particular aspect of this embodiment, the parameter of the encoded signal is signal power. In addition, the communications link may further include a plurality of channels over which a plurality of associated encoded signals are transmitted, the parameter adjustment module adjusting the power of at least one of the encoded signals according to the fed back bit error rate so as to achieve an optimal bit error rate over the plurality of channels. Still further, the parameter may be a transmission power of the encoded signal and the parameter adjustment module may increase the transmission power if the received bit-error rate is higher than the target bit error rate and decreases the transmission power if the received bit-error rate is lower than the target bit error rate. Finally, the transmitter may include an electro-optical transducer for converting the encoded signal from an electrical signal to an optical signal.

In a particularly preferred method according to the present invention for improving transmission quality in a communications system, the system includes a transmitter having a parameter adjustment module, a receiver having an error detection module, and a communications link coupling the transmitter and receiver, the method includes the steps of determining a bit-error rate of an encoded signal transmitted over the communications link within the receiver; feeding back the bit-error rate to a parameter adjustment module within the transmitter; and adjusting a signal parameter of the encoded signal based on the fed back bit-error rate. In one particular aspect of the method, the determining step further includes determining a number of bit errors within the encoded signal over a predetermined period of time; and determining the bit-error rate based on the determined number of bit errors. In yet another aspect of the invention, the method includes performing forward error correction on the encoded signal. In still another aspect of the method, the signal parameter is a transmission power of the encoded signal and the step of adjusting further includes the step of adjusting the transmission power based on the fed back bit error rate.

In yet another aspect of the method of the present invention, the communications link further includes a plurality of channels over which a plurality of associated encoded signals are transmitted and wherein the step of adjusting further includes adjusting the power of at least one of the encoded signals according to the fed back bit error rate so as to achieve an optimal bit error rate over the plurality of channels. In variations of this aspect, the signal parameter may be a transmission power of the encoded signal and the step of adjusting may include increasing the transmission power if the bit-error rate is higher than the optimal bit error rate over the plurality of channels and decreasing the transmission power if the bit-error rate is lower than the optimal bit error rate over the plurality of channels.

In still another aspect of the method of the present invention, the system is an optical wave division multiplexed system, the encoded signal is an optical signal within the system and the signal parameter is one of the following group of optical signal parameters: a transmission power, a chirp, an operating wavelength, an eye shape, or a polarization, and the step of adjusting includes adjusting at least one of these optical signal parameters based on the fed back bit error rate. In a particular aspect of this method, the step of adjusting the step of adjusting includes adjusting at least two of the group of optical signal parameters based on the fed back bit error rate. In another aspect of this invention, the parameter adjusting module is one of the following group of devices: a variable optical attenuation unit, a gain control unit for an amplifier, or a Raman amplifier, the step of adjusting further includes adjusting at least one of the group of devices based on the fed back bit error rate so as to adjust the signal parameter. In still another aspect of this invention, the method further includes the step of performing forward error correction on the optical signal.

DESCRIPTION OF THE PREFERRED EMBODIMENTS

The present invention is a system and method for improving the quality of signal transmissions in an optical communications system. When used herein, the expression "optical communication system" relates to any system which uses optical signals to convey information across an optical waveguide. Thus, while a specific type of optical communications system may be discussed below (e.g., WDM), the invention is not to be limited in any way by this discussion.

Figure 1:
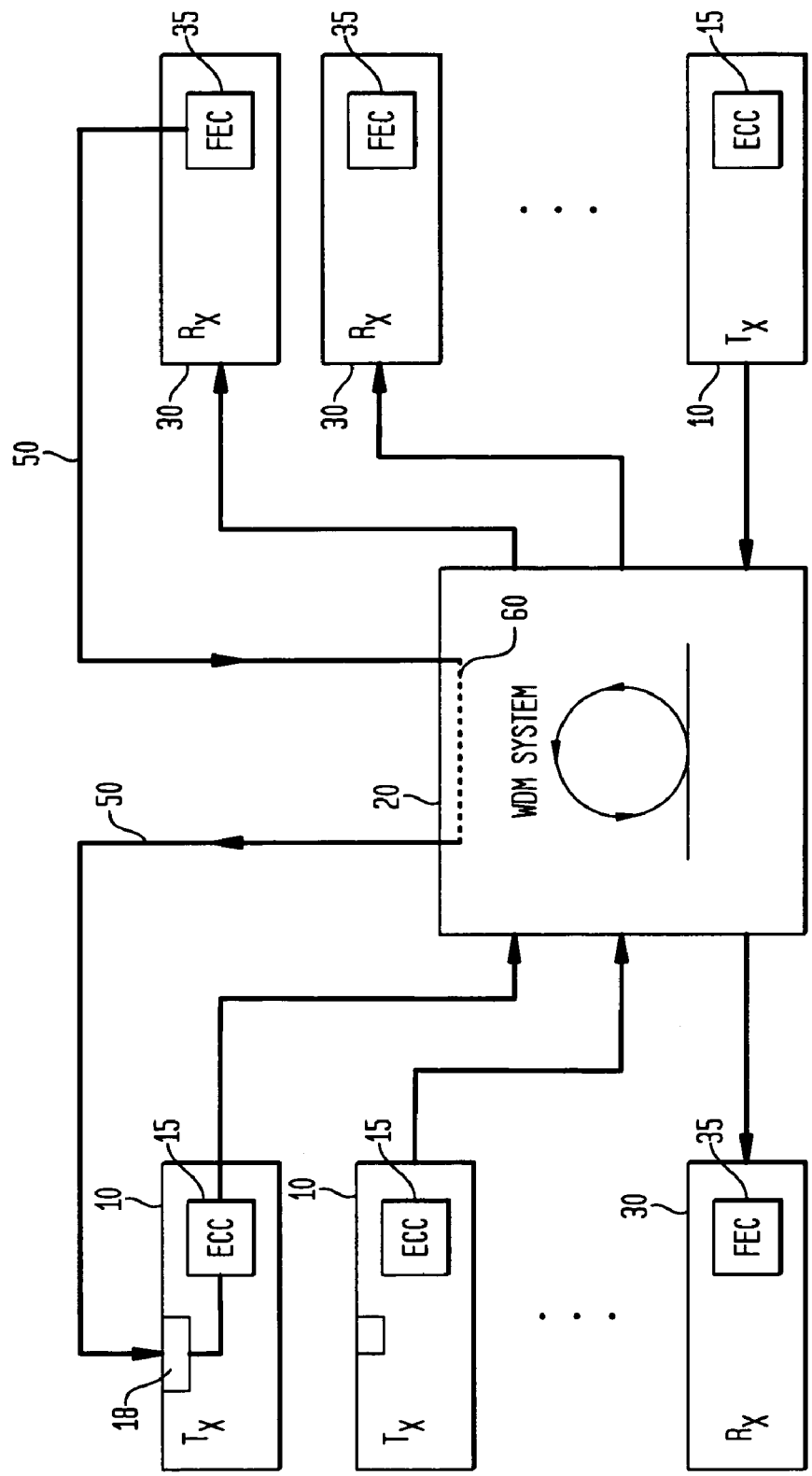
FIG. 1 is a diagram showing one embodiment of the invention for improving signal transmission quality in an optical communications system.

Referring to FIG. 1, a fiber-optic communications system 1 includes at least one transmitter 10, a wavelength-division multiplexing (WDM) system 20, and at least one optical receiver 30. The optical transmitter(s) may be a conventional type which includes an optical source such as a semiconductor laser or light-emitting diode, a modulator for modulating a carrier wave, and a channel coupler which connects the transmitter to the WDM system. In addition to these features, the transmitter includes a circuit or software 15 which performs error-correction coding (ECC). ECC may be used to encode the transmittal optical signals for the purpose of minimizing the average probability of bit errors (i.e., bit-error rate) measured at the receiver, subject, for example, to constraints on received power and channel bandwidth. The use of error correction coding is advantageous because it decreases the bit-error rate (BER) per channel and allows the system to achieve a more error-free performance, particularly in the presence of amplifier's noise and nonlinear optical channel effects. Finally, the transmitter 10 includes a parameter adjustment module 18 coupled to feed back circuit 50 which controls certain optical parameters of the transmitted signals issued by the transmitter.

The WDM system 20 may be any type conventionally known. For example, the WDM system may be of a type which has only a single optical fiber carrying a plurality of optical channels. Alternatively, the system may include a plurality of optical fibers bundled for sustaining higher transmission capacity. In addition to the fiber(s), the system includes one or more multiplexer circuits, optical amplifiers, gain control circuits, demultiplexers, filters, variable optical attenuators, add/drop circuits and/or other circuit components conventionally found in a WDM system. In FIG. 1, the optical fiber(s) shown carry signals in one direction, and a separate transmitter-receiver pair, 10, 30 is provided for each channel. If desired, the WDM system may use bi-directional transmission lines. U.S. Pat. No. 6,313,933 discloses one bi-directional system of this type.

The receivers 30 convert optical signals from the WDM system into electrical signals. A conventional optical arrangement may be used to perform this conversion. Such an arrangement may include, for example, a channel coupler circuit and a photodetector. Each optical receiver also includes a forward error correction (FEC) chip module 35 which performs at least two functions. The first function is using the received ECC encoded signal to count the number of errors that exist in a given channel over a predetermined period of time. The second function is correcting the detected errors and outputting an optical signal which is substantially error free. An FEC chip module of this type is known and, for example, described in the standards ITU T G.709 or ITU T G.975 Further, any of a number of conventional forward error correction schemes may be performed by module 35. One non-limiting example is convolutional coding.

Figure 2:
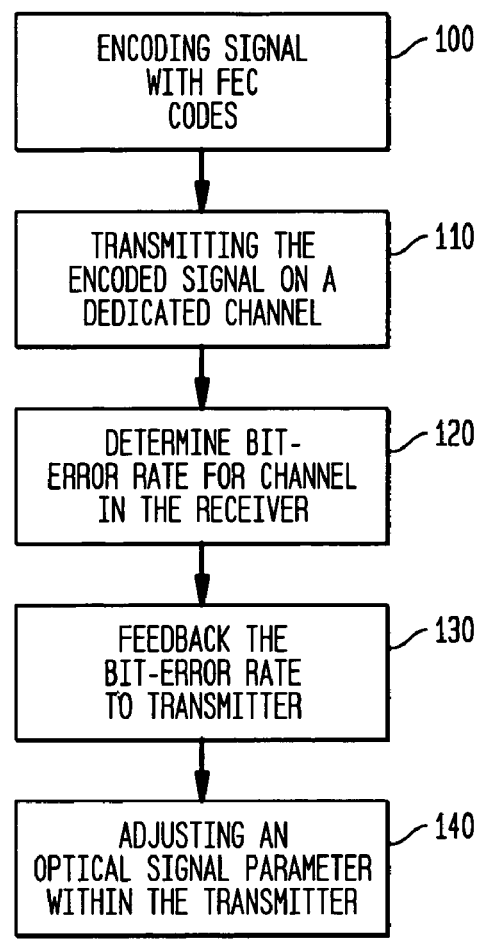
FIG. 2 is a flow diagram showing steps included in one embodiment of a method of the present invention for improving signal transmission quality in an optical communications system.

The method of the present invention may be implemented in an optical system as described above. Referring to FIG. 2, a preferred embodiment of the method includes, as an initial step 100, encoding an optical signal with one or more error correction codes using, for example, the ECC circuit in one of the transmitters.

Figure 3:
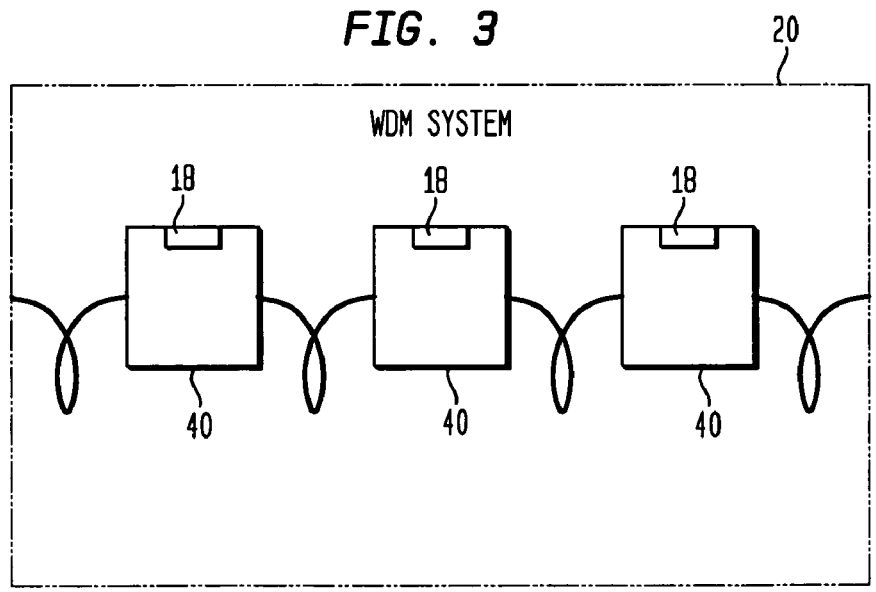
FIG. 3 is a diagram of one embodiment of an exemplary WDM system according to the present invention.

A second step 110 of the method includes transmitting the optical signal along one of the multiple channels in the WDM system. While in the WDM system, the signal may be amplified by one or more amplifiers 40 as shown in FIG. 3. These amplifiers may be any one of the known amplifier types, such as an erbium-doped fiber amplifier.

A third step 120 of the method includes forwarding the signal from the WDM circuit to a corresponding receiver. In the receiver, the resident FEC chip module uses the ECC encoded signal to determine the number of errors that occurred in the channel over a period of time. The module then directly determines the bit-error rate for the channel based on this count information. For example, if 3 bit errors were detected by the FEC module over a time period in which 1 million bits were received, the determined BER value would be $3 \times 10^{-6}$.

A fourth step 130 of the method includes feeding back information indicative of the bit-error rate over a feedback circuit, 50 of FIG. 1, which may be located within either or both of the transmitter and the WDM system. In accordance with the present invention, the FEC chip module feeds back the BER value to the feedback circuit.

A fifth step 140 of the method includes using the parameter adjustment module adjust one or more optical signal parameters based on the fed-back BER information. As a result of these steps, a signal is output from the receiver with substantially fewer errors or even no errors. The adjustment performed by the feedback circuit is therefore advantageous because it improves the transmission quality in the system, as will become more apparent from the discussion which follows.

Referring to FIGS. 1 and 3, the feedback circuit 50 and coupled parameter adjustment module 18 may be located in either or both of the transmitter and the WDM system (i.e. the amplifiers in particular) and may take one of a variety of forms. In accordance with one aspect of the invention, the parameter adjustment module adjusts the power of at least one optical channel in the system. As shown in FIG. 1, the BER value may be fed back through, for example, feedback optical path 50 which includes an optical supervisory channel 60 of the WDM system. Feeding back the BER value to the transmitter and/or amplifiers will enable the parameter adjustment module 18 to adjust power in a way that will improve the signal transmission quality for the subject channel.

As an example, the channel power of the transmitter may be adjusted in accordance with the following steps. Once the BER value for a particular channel is fed back to the transmitter or amplifier, a comparison is performed by parameter adjustment module 18. If the fed-back BER value is higher than a certain reference value, the transmitter power for the channel may be increased by the parameter adjustment module to concentrate for the unacceptably high BER. The reference value itself may be a predetermined bit-error rate value corresponding to a desired level of signal-transmission performance in the system, e.g. a minimum BER level supportable by the system In this manner, the optical system of the present invention reduces the number of transmitted errors and improves transmission signal quality. This process may be iterative so as to make step-wise adjustments to the optical signal parameter. The FEC module 35 may thus use a decoding algorithm implemented in the receiver to measure a new BER value for the channel, which is then fed back to the transmitter and/or amplifiers. The new BER value is expected to be closer to the reference BER value because of the power increase. If the difference between the new BER and the reference BER lie within a specific tolerance amount, the power adjustment phase of the invention is concluded. If the new BER value does not equal the reference BER value to within the given tolerance, the channel power in the transmitter is increased again by the same or a different increment. The resulting BER for the channel is then fed back to the transmitter and compared by the processor. Incremental power adjustments and BER comparisons will continue until the desired BER value for the channel is fed back from the receiver.

As an example of this process, consider the case where a BER value of $10^{-7}$ for a particular channel is fed back to the transmitter and the reference BER is $10^{-9}$. In accordance with the present invention, the transmitter power for that channel is increased to lower the bit-error rate. To effect the increase, a processor within the parameter adjustment module 18 observes that the difference between the fed-back BER value and the reference BER value is not within an acceptable tolerance amount. Accordingly, the transmitter or amplifier increases the transmitter power for that channel by a predetermined increment. Say, for example, a new BER of $10^{-8}$ is then determined by the FEC module and fed back. The power is then increased once more by the parameter adjustment module until the fed back BER value is $10^{-9}$. If the parameter adjustment module determined that the BER value is lower than the reference BER value, an unnecessarily low bit-error rate may be found to exist for that channel. For example, it may be an operational condition that the optical system only requires a bit-error rate of $10^{-7}$. If, however, the transmitter power is set to an unnecessarily low level, say a bit-error rate of $10^{-9}$ the optical system would be expending an unnecessary amount of transmitter power for that channel. Under these circumstances, the fed-back BER may be used by the parameter adjustment module to decrease the transmitter power and thereby achieve a bit-error rate which corresponds to the reference BER value. As with the previously described method, this adjustment may be iteratively performed by effecting incremental power changes until the desired BER of $10^{-7}$ is achieved for that channel.

Performing power adjustments in accordance with the method of the invention ensures that a desired bit-error rate will be achieved for any channel in the system. This, in turn, will serve to optimize transmission signal quality for at least that channel. In order to optimize the signal transmission quality of the overall system, the method of the present invention may be applied in an analogous manner to multiple channels or even all the channels in the optical system. When extending the present invention to more than one channel, it is understood that because the optical transmitters are constrained by a fixed amount of aggregate power, which is distributed among the various channels in the network, performing a power adjustment for any one channel may affect the power for another channel. Through the use of an optimization circuit, the present invention may transfer power from one channel having an unnecessarily low a bit-error rate to another channel having an unacceptably high bit-error rate. In this way, the distribution of transmitter power may be optimized while simultaneously ensuring that signal transmission quality will be improved on a channel-by-channel basis.

In accordance with another aspect of the invention, the parameter adjustment module includes a pre-chirp module located in the transmitter. The phenomenon known as "chirp" occurs when the light source of an optical transmitter is modulated thereby effecting changes which impose a time-dependent frequency shift in the output signal. This shift is referred to as a chirp in the signal. The chirp of an optical pulse may be changed by using a modulator in the optical transmitter. The pre-chirp module of the present invention may include a modulator of this type. It is well known that the degree of chirp that occurs in an optical signal is dependent upon the modulation waveform. Accordingly, once the BER value for a given channel is fed back by the FEC module, the pre-chirp module within the parameter adjustment module may adjust the modulation of the optical signal and thus the slope of the chirp to improve the transmission quality of that channel. The adjustment may be performed, for example, if the BER value is above or below a certain threshold value. When this occurs, the pre-chirp module may automatically adjust the slope of the chirp, for example, by a predetermined increment and in a predetermined shift direction.

In accordance with another aspect of the invention, the parameter adjustment module 18 adjusts the wavelength of the transmitter laser based on the bit-error rate information fed back from the FEC module. The wavelength adjustment circuit of the invention may, for example, use the BER to change one or more of the active, phase-control, or Bragg sections of a tunable semiconductor laser to effect the wavelength adjustment. The amount of the adjustment may be based upon predetermined increments so as to incrementally achieve a target or threshold BER rate. Fine-tuning the transmitter laser's wavelength in this manner ideally results in a more appropriate wavelength correspondence in relation to the spectral filters within the WDM system. In this fashion, the optical signal transmission of the optical system is optimized by the present invention.

In accordance with another aspect of the invention, the parameter adjustment module adjusts the eye shape of the optical signal within the optical system. It is well known that the eye shape of an optical signal provides an indication of system performance. Generally speaking, the degree to which the eye is closed provides a measure of performance degradation and this is usually associated with a corresponding increase in bit-error rate. The feedback parameter adjustment module of the invention uses the fed-back BER value as a basis for adjusting the crossing point of the signal eye in order to improve transmission quality. The adjustment may be made, for example, by changing the reference voltage of the driver of the transmitter modulator. This reference voltage determines for example the crossing point in signal eye fed to the modulator. In particular, the transmitted eye may be forced to be asymmetrical such that the signal is deformed during the transportation of the optical pulse through the system to produce a more symmetrical eye shape at the receiver. The degree to which the eye is made asymmetrical may be governed by predetermined patterns stored, for example, in a computer memory. The predetermined patterns may correspond to varying degrees of eye shape asymmetry.

In accordance with another aspect of the invention, the parameter adjustment module adjusts the polarization of the transmitted signal based on the BER value fed back from the FEC module. The polarization adjustment performed by this feedback circuit may be connected with a comparison between the fed-back BER and a desired BER. The adjustment may be in predetermined increments or to a desired polarization state.

In accordance with another aspect of the invention, the parameter adjustment module may adjust one or more of the aforementioned parameters to improve transmission quality in the system. For example, an adjustment may be made to power and eye shape. Alternatively, polarization and transmitter wavelength may be simultaneously adjusted to achieve a target BER at the receiver.

According to another aspect of the present invention, the parameter adjustment module adjusts the attenuation of a variable optical attenuator based on a BER value fed back by the FEC module in one of the receivers. The change in attenuation will effect a corresponding adjustment in channel power that will produce a desired BER in the system. The attenuation (and thus power) adjustment may be performed for one optical channel or for a group of optical channels. If desired, an iterative adjustment process, as described above, may be used to perform power adjustments until the desired BER value is achieved. Also, more than one receiver in the system may feed back BER values through the feedback circuits the of the WDM system to effect power level adjustments across a plurality of channels.

According to another aspect of the invention, the parameter adjustment module adjusts a channel amplifier, 18 of FIG. 3, within the WDM system as a way of adjusting power. More specifically, after the bit-error rate for at least one channel is determined by the FEC module, the bit-error rate is fed back to a gain control circuit used to control an amplifier for the channel of interest. The gain control circuit, which has been adapted to be responsive to the fed-back BER value, adjusts the gain for that channel to thereby effect a power increase or decrease depending upon the relationship of the fed-back BER value to a reference BER value. If desired, amplification for all channels in the WDM system may be performed based on individual BER values detected for each channel.

According to another aspect of the invention, the parameter adjustment module includes a dispersion compensation unit. The phenomenon known as chromatic dispersion relates to the speed with which optical signals propagate over a given fiber. The speed is dependent upon various fiber characteristics such as core radius and index difference. An excessive amount of chromatic dispersion results in a temporal broadening of the signal pulse that degrades the quality of the transmitted signal. When an unacceptable bit-error rate value is fed-back from the FEC module, the parameter adjustment module of the present invention adjusts various parameters within the WDM system to reduce these dispersion effects. The parameters may include, for example, fiber length, index difference, etc. Filters and various types of electronic equalization circuits which adjust parameters of this type are well known. One illustrative type is based on the tunable chromatic dispersion of the Bragg grating within a special fiber.

According to another aspect of the invention, the parameter adjustment module adjusts the polarization or phase of one or more of the optical signals passing through the WDM system. These polarization and phase adjustments are made based on the fed-back BER value as described above and may be effected by known adjustment circuits.

According to another aspect of the invention, the parameter adjustment module adjusts the parameters of one or more Raman amplifiers in the WDM system. A Raman amplifier uses stimulated Raman scattering which occurs in fibers when an intense pump beam propagates through it. In operation, low-frequency channels are amplified by the high-frequency channels as long as the frequency difference is within the bandwidth of the Raman gain. When an unacceptable BER value is fed back from the FEC module in at least one of the receivers, the parameter adjustment module may adjust Raman amplifier parameters in a predetermined manner to improve signal quality.

According to another aspect of the invention, the parameter adjustment module may adjust a combination of the aforementioned parameters of the WDM system based on fed back BER values for multiple channels. An algorithm may be used to find optimal values for these parameters. For example, such an algorithm may find optimal values for the dispersion and output power of amplifiers (including EDFA and Raman amplifiers) for a plurality of channels.

One optimization algorithm for performing the foregoing adjustments involves forcing an increase of at least one of the fed-back BER values by decreasing power per channel. This is followed by a fine adjustment of the dispersion value and/or other parameters using the fed-back BER value. The power is then returned to the original level to decrease the fed-back BER value. This integrated approach is especially advantageous because it has the potential of producing a more significant improvement in transmission quality in the system.

Figure 4:
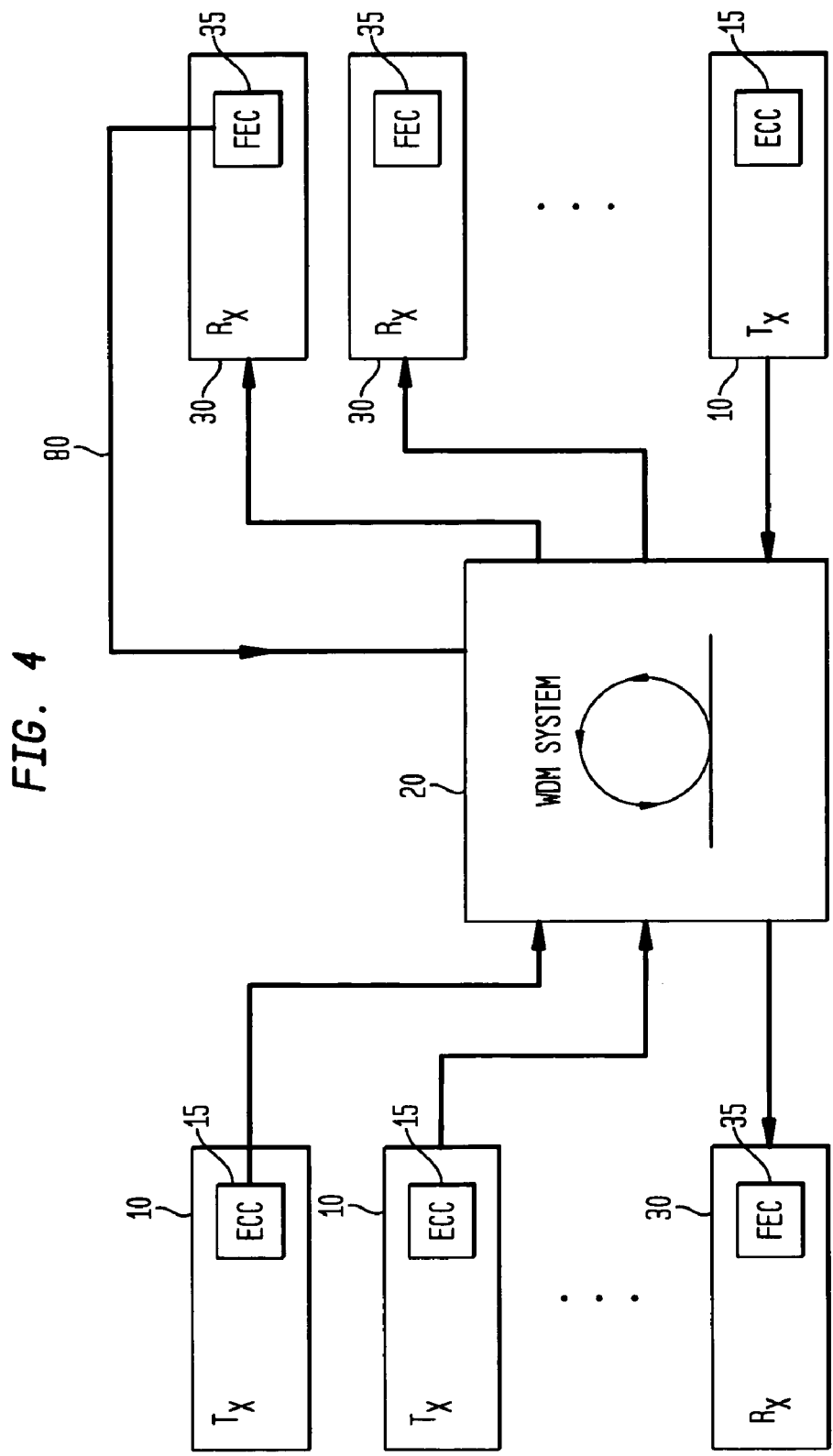
FIG. 4 is a diagram showing another embodiment of the present invention for improving signal transmission quality in an optical communications system.

Referring to FIGS. 3 and 4, a second embodiment of the apparatus of the present invention is similar to the first embodiment except that the bit-error rate value is fed back along an optical path or feed back circuit 80 to the parameter adjustment module(s) 18 in the WDM system. As described above with respect to the first embodiment, parameter adjustment module 18 may adjust one of a variety of optical signal parameters, either individually or on a system-wide basis to improve transmission quality in the optical system.

For example, the internal parameters of amplifiers including EDFA and Raman amplifiers may be adjusted using fed-back BER values from several channels. Other sub-components within the WDM system that may be adjusted by the invention include multiplexers with internal variable optical attenuators, as well as individual per-channel attenuators or even a group of attenuators.

Figure 5:
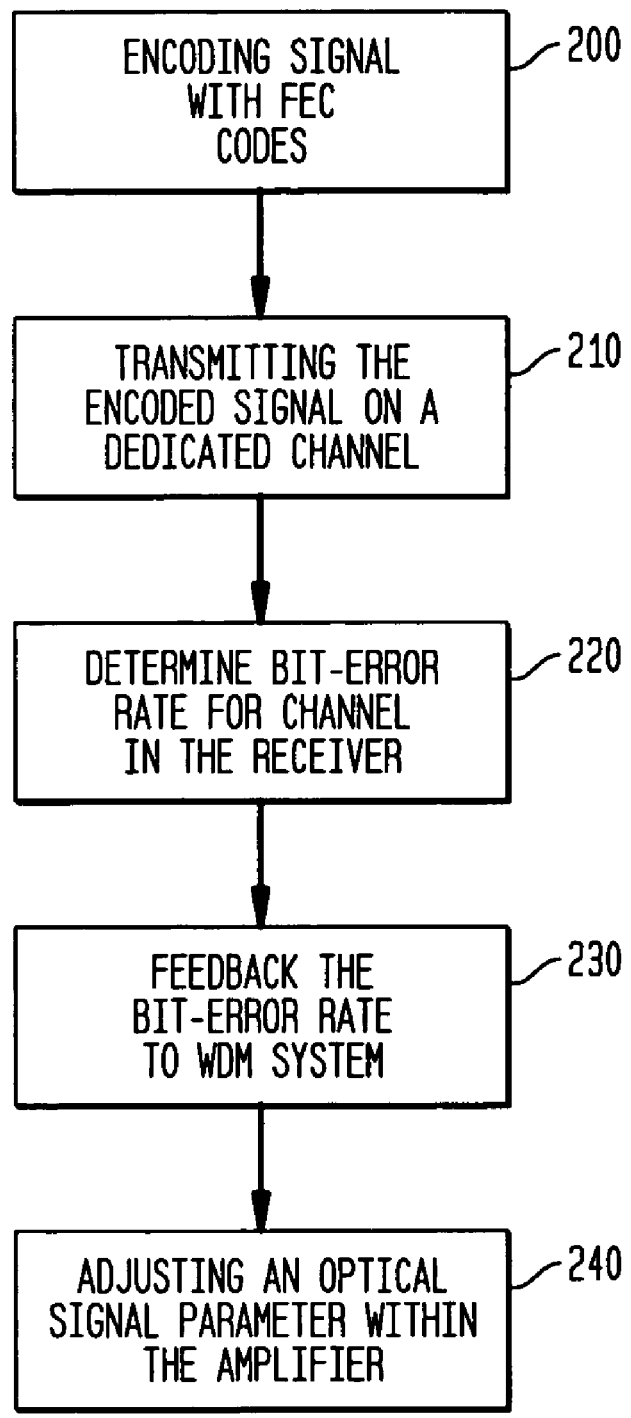
FIG. 5 is a flow diagram showing steps included in another embodiment of a method of the present invention for improving signal transmission quality in an optical communications system.

Referring to FIG. 5, a method of the present invention is provided according to the additional embodiment shown in FIG. 4. This method includes, as an initial step 200, encoding an optical signal with one or more error correction codes using, for example, the ECC circuit in one of the transmitters. A second step, 210, of the method includes transmitting the optical signal along one of the multiple channels in the WDM system. A third step 220 of the method includes using the resident FEC module determine the number of errors in the ECC encoded signal that occurred in the channel over a period of time. A fourth step, 230, of the method includes feeding back information indicative of the bit-error rate over a feedback circuit, 80 of FIG. 4, coupled to the WDM system. Finally, a fifth step 240 of the method includes adjusting an optical signal parameter within the WDM amplifier(s) based on the fed-back BER information. As a result of these steps, a signal is output from the amplifiers with substantially fewer errors or even no errors.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. A system for improving transmission quality in a communications system, said system comprising:
   a transmitter having an parameter adjustment module, said transmitter outputting an encoded signal, said parameter adjustment module adjusting a parameter of said encoded signal, said parameter adjustment module comprising a Raman amplifier;
   a communications link having first and second ends, said first end being connected to said transmitter;
   a receiver connected to said second end of said communications link, said receiver including an error detection module that determines a bit-error rate for a signal channel over which said encoded signal is transmitted;
   a feedback path coupling said transmitter and said receiver, said feedback path feeding back said bit-error rate from said error detection module, wherein said parameter adjustment module adjusts said parameter of said encoded signal based on said fed back bit-error rate, said parameter adjustment module adjusting a parameter of said Raman amplifier based on said bit-error rate; and
   a comparator said comparator using said fed back bit error rate to cause said parameter adjustment module to adjust a parameter of at least one of a plurality of encoded signals via an optimization algorithm adapted to achieve an optimal bit error rate over a plurality of channels, each of said plurality of encoded signals associated with a corresponding channel of said plurality of channels.

2. The system of claim 1, wherein said error detection module further comprises:
   a forward error correction module that determines a number of bit errors within said encoded signal received by said receiver, said determined number of bit errors being used to determine said bit error rate, said forward error correction module correcting a portion of said determined number of bits errors after said bit error rate is fed back over said feedback path and outputting a corrected, encoded output signal from said system.

3. The system of claim 1 wherein said communications link further comprises said plurality of channels over which said plurality of associated encoded signals are transmitted, each of said plurality of encoded signals having a signal parameter, said parameter adjustment module adjusting said signal parameter of a corresponding one of said encoded signals according to said fed back bit error rate.

4. The system of claim 1 wherein said parameter of said encoded signal is signal power.

5. The system of claim 4 wherein said communications link further comprises a plurality of channels over which a plurality of associated encoded signals are transmitted, said parameter adjustment module adjusting a power of at least one of said encoded signals according to said fed back bit error rate so as to achieve said optimal bit error rate over said plurality of channels.

6. The system of claim 1 wherein said communication system is an optical communication system, said communications link is an optical fiber, said encoded signal is an optical signal, and said parameter adjustment module adjusts an optical parameter of said optical signal.

7. The system of claim 6 further comprising an optical amplifier coupled to said transmitter for adjusting an optical transmission power as said parameter of said optical signal.

8. The system of claim 6 wherein said optical parameter is a chirp of said optical signal.

9. The system of claim 6 wherein said optical parameter is an operating wavelength of said encoded optical signal.

10. The system of claim 6 wherein said optical parameter is an eye shape of said optical signal transmitted on said optical fiber.

11. The system of claim 6 wherein said optical parameter is a polarization of said optical signal transmitted on said optical fiber.

12. The system of claim 6 wherein said parameter adjustment module is a dispersion compensator and said optical parameter is a dispersion of said optical signal such that said dispersion on said optical fiber is minimized by said dispersion compensator.

13. The system of claim 6, wherein said parameter adjustment module adjusts a plurality of optical parameters of said optical signal based on said fed back bit error rate, said optical parameters comprising: an optical channel power, an optical channel wavelength, a optical channel chirp, an optical signal polarization, and an eye shape of an optical signal transmitted on said optical channel.

14. The system of claim 6 wherein said optical fiber is included within a wave-division multiplexed optical system; said wave-division multiplexed (WDM) system including a plurality of optical channels each carrying an encoded optical signal.

15. The system of claim 14 wherein said feed back path is an optical supervisory channel of said wave-division multiplexed system for transmitting said bit error rate, said optical supervisory channel being separate from said plurality of optical channels transmitting said encoded optical signals.

16. The system of claim 14 wherein said parameter adjustment module includes a variable optical attenuation unit for each channel within said WDM system, each variable optical attenuation unit adjusting an attenuation parameter for said optical signal in each channel based on said bit-error rate.

17. The system of claim 14 further comprising an amplifier coupled to each of said channels of said WDM system, said amplifiers including a gain control unit as said parameter adjustment module, said gain control unit adjusting a gain and gain tilt of at least one of said amplifiers for said optical channel based on said fed back bit-error rate.

18. The system of claim 14, wherein said parameter adjustment module includes a polarization unit, said parameter adjustment module adjusting a polarization of said optical signal.

19. The system of claim 14, wherein said parameter adjustment module adjusts a plurality of optical parameters of said optical signal within an optical channel in said WDM system based on said fed back bit error rate, said optical parameters comprising: a variable optical attenuation, an amplifier gain and gain tilt, a Raman amplifier parameter, an optical power, and a polarization for an optical signal.

20. The system of claim 1 wherein said transmitter includes an electro-optical transducer for converting said encoded signal from an electrical signal to an optical signal.

21. The system of claim 1 further comprising a regenerator coupled to said communications link.

22. A transmitter coupled to a communications link and a bit error rate channel, said transmitter transmitting an encoded signal over said communications link, said transmitter comprising:
an input port for receiving bit-error rate information over said bit error rate channel; and
a parameter adjustment module coupled to said input port that adjusts a parameter of the encoded signal based on said received bit-error rate information, said parameter adjustment module comprising a Raman amplifier, said parameter adjustment module adjusting a parameter of said Raman amplifier based on said received bit-error rate information, wherein said communications link further comprises as, plurality of channels over which a plurality of associated encoded signals are transmitted, said parameter adjustment module adjusting a power of said each of said plurality of associated encoded signals according to said received bit error rate via an optimization algorithm adapted achieve an optimal bit error rate over the plurality of channels.

23. The transmitter of claim 22 wherein said parameter of said encoded signal is signal power.

24. The transmitter of claim 22 wherein said parameter of said encoded signal is a transmission power of said encoded signal and said parameter adjustment module increases said transmission power if said received bit-error rate is higher than a target bit error rate and decreases said transmission power if said received bit-error rate is lower than said target bit error rate.

25. The system of claim 22 wherein said transmitter includes an electro-optical transducer for converting said encoded signal from an electrical signal to an optical signal.

26. A method for improving transmission quality in a communications system, said system including a transmitter having a parameter adjustment module, a receiver having an error detection module, and a communications link coupling said transmitter and receiver, said method comprising:
determining a bit-error rate of an encoded signal transmitted over said communications link within said receiver;
feeding back said bit-error rate to a parameter adjustment module within said transmitter, said parameter adjustment module comprising a Reman amplifier; and
adjusting a signal parameter of said encoded signal based on said fed back bit-error rate, said parameter adjustment module adjusting a parameter of said Raman amplifier based on said fed back bit-error rate information, wherein said communications link further comprises a plurality of channels over which a plurality of associated encoded signals are transmitted;
adjusting a power of at least one of said encoded signals according to said fed back bit error rate via an optimization algorithm adapted achieve an optimal bit error rate over said plurality of channels.

27. The method of claim 26, wherein said determining step further comprises: determining a number of bit errors within said encoded signal over a predetermined period of time; and determining said bit-error rate based on said determined number of bit errors.

28. The method of claim 27 further comprising performing forward error correction on said encoded signal.

29. The method of claim 27 wherein said signal parameter is a transmission power of said encoded signal and said step of adjusting further includes adjusting said transmission power based on said fed back bit error rate.

30. The method of claim 27 wherein said system is an optical wave division multiplexed system, said encoded signal is an optical signal within said system and said signal parameter is one of a group of optical signal parameters comprising: a
transmission power, a chirp, an operating wavelength, an eye shape, or a polarization, said step of adjusting includes adjusting at least one of these optical signal parameters based on said fed back bit error rate.

31. The method of claim 30, wherein said step of adjusting includes adjusting at least two of said group of optical signal parameters based on said fed back bit error rate.

32. The method of claim 30, wherein said parameter adjusting module is one of a group of devices comprising: a variable optical attenuation unit, a gain control unit for an amplifier, or a Raman amplifier, said step of adjusting further including adjusting at least one of said group of devices based on said fed back bit error rate so as to adjust said signal parameter.

33. The method of claim 30 further comprising performing forward error correction on said optical signal.

34. The method of claim 26 wherein said signal parameter is a transmission power of said encoded signal and said step of adjusting includes increasing said power if said bit-error rate is higher than said optimal bit error rate over said plurality of channels and decreasing said power if said bit-error rate is lower than said optimal bit error rate over said plurality of channels.

* * * * *